United States Patent
Deng et al.

(10) Patent No.: US 10,268,549 B2
(45) Date of Patent: Apr. 23, 2019

(54) HEURISTIC PROCESS FOR INFERRING RESOURCE DEPENDENCIES FOR RECOVERY PLANNING

(71) Applicant: International Business Machines Corporation, Armonk, NY (US)

(72) Inventors: Yu Deng, Yorktown Heights, NY (US); Richard Edwin Harper, Chapel Hill, NC (US); Ruchi Mahindru, Elmsford, NY (US); Harigovind Venkatraj Ramasamy, Ossining, NY (US); Soumitra Sarkar, Cary, NC (US); Mahesh Viswanathan, Yorktown Heights, NY (US); Long Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 15/059,795

(22) Filed: Mar. 3, 2016

(65) Prior Publication Data
US 2017/0255474 A1 Sep. 7, 2017

(51) Int. Cl.
| | |
|---|---|
| *G06F 8/41* | (2018.01) |
| *G06F 9/52* | (2006.01) |
| *G06F 11/14* | (2006.01) |
| *G06F 9/445* | (2018.01) |

(52) U.S. Cl.
CPC .......... *G06F 11/1438* (2013.01); *G06F 9/445* (2013.01); *G06F 9/52* (2013.01); *G06F 8/433* (2013.01)

(58) Field of Classification Search
CPC .... G06F 9/4401; G06F 9/4405; G06F 9/4403; G06F 9/4406; G06F 9/441; G06F 9/445; G06F 11/0793; G06F 11/1402; G06F 11/1417; G06F 11/1438; G06F 11/1441; G06F 1/24
See application file for complete search history.

(56) References Cited

U.S. PATENT DOCUMENTS

| | | | |
|---|---|---|---|
| 7,389,410 B1 * | 6/2008 | Hardman | G06F 9/445 706/55 |
| 8,793,690 B2 | 7/2014 | Vernier | |
| 9,146,814 B1 * | 9/2015 | van der Merwe | G06F 11/3031 |
| 10,089,163 B2 * | 10/2018 | Sarkar | G06F 11/0709 |

(Continued)

OTHER PUBLICATIONS

VMware, "VMware Site Recovery Manager 6.1", Evaluation Guide, Sep. 2015, pp. 1-28.

(Continued)

*Primary Examiner* — Gabriel Chu
(74) *Attorney, Agent, or Firm* — Fleit Gibbons Gutman Bongini Bianco PL; Jose Gutman

(57) ABSTRACT

A system, a computer readable storage medium, and a method for determining a suggested component restart order in a computer system on a basis of one or more heuristic analyses of a plurality of input data. The method can include performing one or more sort or merge orders after one or more of each heuristic analysis, combining the one or more sort orders according to a weighting algorithm, generating a recovery dependency graph between each of the components of the computer system, and presenting the recovery dependency graph.

17 Claims, 4 Drawing Sheets

(56) References Cited

U.S. PATENT DOCUMENTS

| | | | |
|---|---|---|---|
| 2004/0083404 A1* | 4/2004 | Subramaniam | G06F 11/2028 714/13 |
| 2005/0278688 A1* | 12/2005 | Buskens | G06F 9/445 717/103 |
| 2008/0172553 A1* | 7/2008 | Childress | G06F 9/4405 713/2 |
| 2009/0172689 A1 | 7/2009 | Bobak et al. | |
| 2009/0307166 A1 | 12/2009 | Routray et al. | |
| 2012/0109844 A1 | 5/2012 | Devarakonda et al. | |
| 2013/0246838 A1* | 9/2013 | Reddy | H04L 41/0659 714/3 |
| 2014/0164607 A1 | 6/2014 | Bai et al. | |
| 2015/0019851 A1* | 1/2015 | Alandt | G06F 9/4416 713/2 |
| 2015/0127970 A1 | 5/2015 | Bivens et al. | |
| 2017/0024293 A1* | 1/2017 | Bell | G06F 11/1438 |
| 2017/0060707 A1* | 3/2017 | Harper | G06F 11/2033 |
| 2017/0115995 A1* | 4/2017 | Lv | G06F 9/4405 |

OTHER PUBLICATIONS

Brown, A., et al., "An Active Approach to Characterizing Dynamic Dependencies for Problem Determination in a Distributed Environment", Proceedings of the IEEE/IFIP International Symposium on Integrated Network Management, May 14-18, 2001, pp. 1-14.

Bahl, P., et al., "Towards Highly Reliable Enterprise Network Services Via Inference of Multi-level Dependencies", Proceedings of the ACM SIGCOMM Data Communication Festival, Aug. 27-31, 2007, pp. 1-12.

Rackware, Inc., "Migration and Building of Data Centers in IBM SoftLayer with the RackWare Management Module", Jun. 2015, pp. 1-11.

* cited by examiner

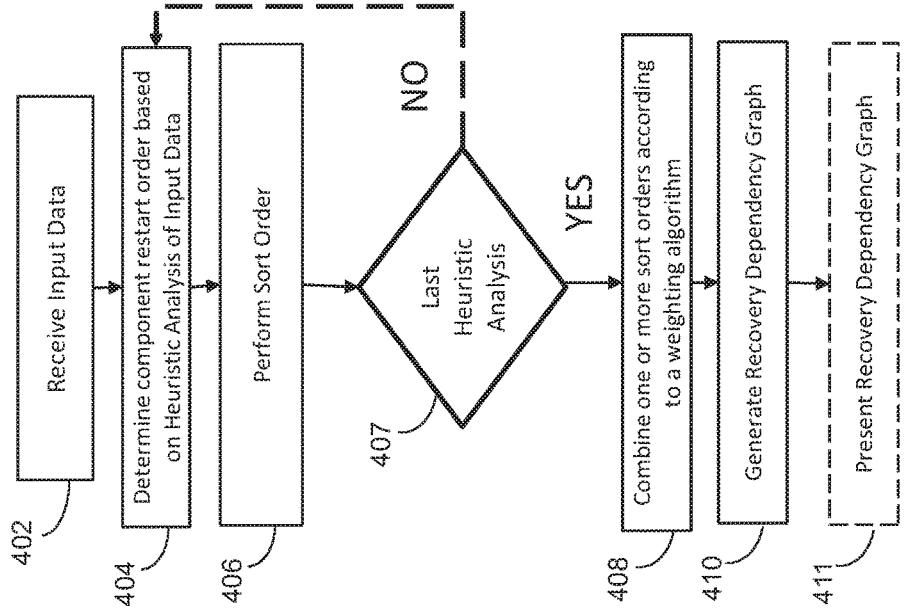

HEURISTIC PROCESS FOR INFERRING RESOURCE DEPENDENCIES FOR RECOVERY PLANNING

BACKGROUND

The present disclosure generally relates to a computer system restart method and system, and more particularly relates to a system and method for using heuristic analysis for recovery planning.

Computer systems are increasingly complex having numerous components and dependencies among components, which can include, but are not limited to servers, middleware, and application software. The failure or disaster of such complex computer systems further exacerbates the recovery process, particularly for restarting information technology or IT business functions such as payroll, accounting, email, accounts receivable, and personnel to just mention a few. Typically, these business functions must be started within a defined Recovery Time Objective or RTO.

Components of the computer system have functional and start-order interdependencies that must be known in order to ensure that workload components are started in the proper order so the workload will start up correctly and to further assess whether the business function can be recovered within the RTO.

BRIEF SUMMARY

According to one embodiment of the present disclosure, a method for determining a suggested component restart order in a computer system includes performing one or more heuristic analyses of a plurality of input data, performing one or more sort or merge orders after one or more of each heuristic analysis and combining the one or more sort or merge orders according to a weighting algorithm. The method can further include generating a recovery dependency graph between each of the components of the computer system and presenting the recovery dependency graph. In some embodiments, the one or more heuristic analysis can include one or more of calculating a popularity of one or more components of a computer system, determining component utilizations for one or more of the components, cross-correlating the component utilizations, or performing machine learning to discover additional relationships between components of the computer system. In some embodiments, the method includes sorting by correlation coefficients of the cross-correlation. In some embodiments, the method further includes processing importance ontology tags to identify components and dependencies of highest priority. In some embodiments the method further includes modifying the recovery dependency graph based on client input, presenting a restart scheduler and execution engine for restarting the computer system with a restart plan, based on the recovery dependency graph, and, restarting the computer system based on the recovery dependency graph using the restart scheduler and execution engine.

In some embodiments, a system includes at least one memory and at least one processor of a computer system communicatively coupled to the at least one memory. The at least one processor can be configured to perform a method including determining a suggested component restart order in the computer system on a basis of one or more heuristic analyses of a plurality of input data, performing one or more sort orders after one or more of each heuristic analysis, and combining the one or more sort orders according to a weighting algorithm. The method can further include generating a recovery dependency graph between each of the components of the computer system and presenting the recovery dependency graph. In some embodiments, the system further includes a user interface for presenting and editing the recovery dependency graph. In some embodiments, the system further includes a mechanism for consuming the recovery dependency graph, and executing the recovery actions on a recovery environment.

According yet to another embodiment of the present disclosure, a computer readable storage medium comprises computer instructions which, responsive to being executed by one or more processors, cause the one or more processors to perform operations as described in the methods or systems above or elsewhere herein.

BRIEF DESCRIPTION OF THE SEVERAL VIEWS OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 4 is a flow diagram illustrating a method according to various embodiments of the present disclosure.

DETAILED DESCRIPTION

Figure 1:
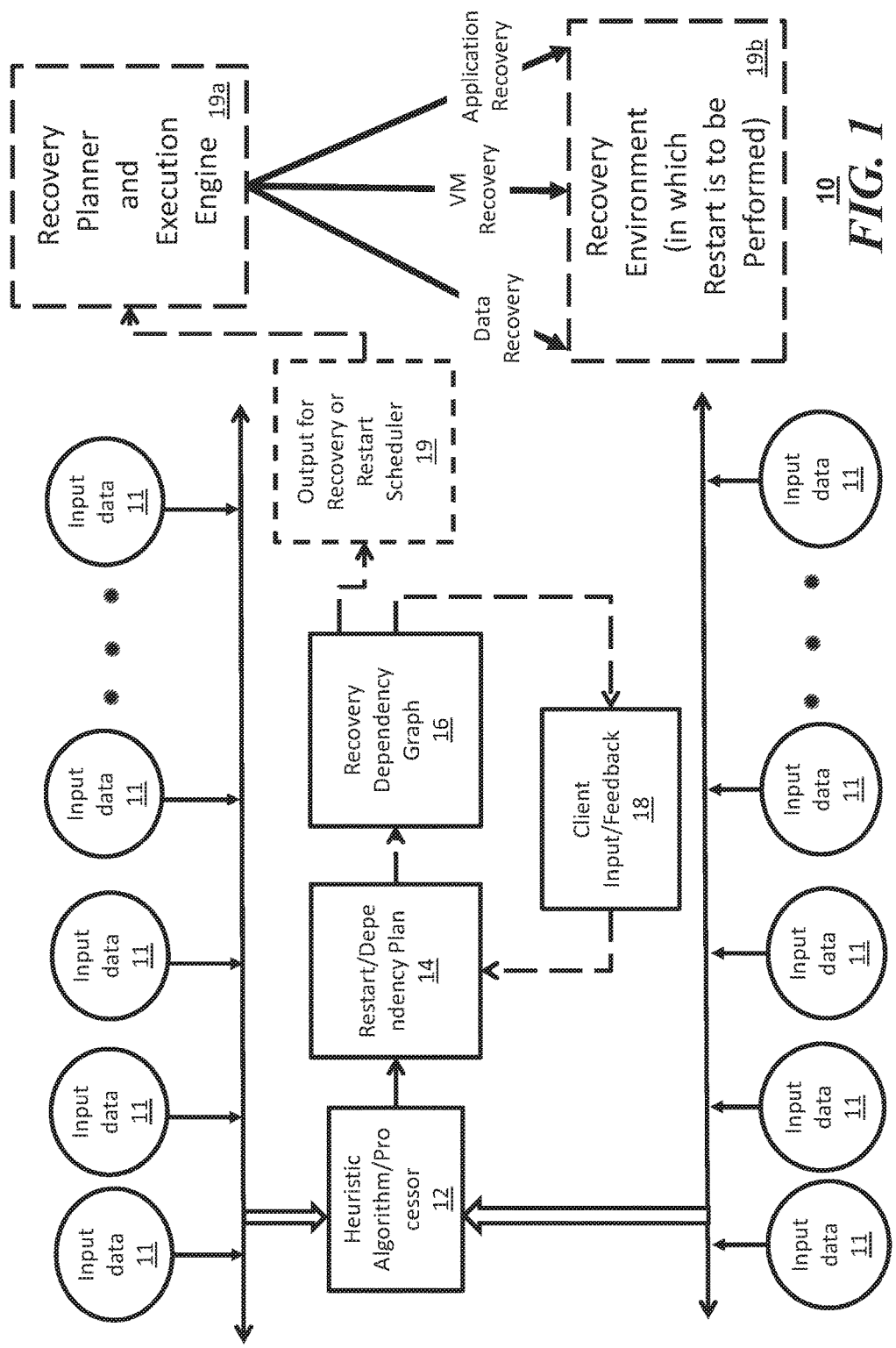
FIG. 1 is a depiction of flow diagram of a system or method for determining a suggested component restart order in a computer system according to various embodiments of the present disclosure.

According to various embodiments of the present disclosure, disclosed is a system and method for gathering and using intelligent or heuristic analysis information of multiple sources of input data to determine an optimal and dependent order in which resources need to be started taking into account the dependency between such resources. Specifically, according to an example, a method or system supplements input data with analytics and heuristics in order to create a dependency graph and recovery plan specifying recovery order and maximum parallelism that ensures that components (of a computer system) in a business function are started in a proper order and as quickly as possible and preferably within a Recovery Time Objective or RTO. As further explained below, the method and system in accordance with the embodiments provides a suggested component restart order on the basis of an analysis of heuristics that can be based on any number of techniques. Note that the current state of manually specifying start order is not feasible in a high scale cloud environment with so many components. Although discovery tools may provide input data that provide structural dependencies, such data must be enhanced in order to allow construction of a fully functional recovery plan in accordance with the embodiments.

Existing input data obtained from a variety of sources can convey logical dependencies and physical layout between components. But further enhancement of such data can enable a more efficient and optimal restart plan. The analysis can include, but is not limited to, the analysis of configuration files, the analysis of network traffic, the analysis of utilization of components, the analysis of provisioning mappings, and/or the analysis of infrastructure and physical utilizations.

Examples of the heuristics that can be used in various embodiments can take many forms, performed in different orderings, and performed in many different combinations. Such heuristics can include sort orders based on page-rank or popularity of components, utilization of components, cross-correlation of utilization, cross-correlation of utilization of components sorted by correlation coefficients, machine learning of complex relationships between components, and/or a combination of sort orders based on some form of weighting algorithm.

One example heuristic analysis can, according to various embodiments, determine a "popularity" value for a particular component based on how many other components in a computer system are contacted by the particular component and how frequently such components are contacted; or based on how many other components in a computer system contact the particular component and how frequently such components make contact with the particular component; or based on a combination of the two determinations of "popularity" value for the particular component. The popularity of a component is a relationship that determines how many other components communicate with a given component and how often the given component makes contact with the other components. This popularity metric can provide a count of the number of references to a component in a communication graph, over a given time interval. The input data can also indicate which components communicate with each other. Generally, components that have a higher degree in the communications graph can be inferred as needing to be started prior to less popular components.

As noted above, another example heuristic analysis can look at utilization of components. Input Data can provide utilization (for example, CPU, memory, storage, storage bandwidth, or network bandwidth) for each component. More heavily utilized components may be more important and therefore will likely need to be started before other components. Another related heuristic metric can look at a Utilization Correlation where components whose utilization is most correlated with other components' utilizations is probably shared by all of them and thus may be more important. In some embodiments, this analysis can be an M×M N-dimensional correlation problem, for M components, and one dimension for each performance metric. In some embodiments, the method or system can create a statistical ML model that is more accurate than a pairwise correlation. In some other embodiments, the system or method can be informed by IT Ontology and existing known dependencies which can be used to prune the number of needed models.

Other example heuristics involve looking at IT domain importance ontology that can based on names of components, known dependency patterns, client based designations, or client feedback. For example, the name and metadata of a component can be used as an indicator of importance. In one instance the name "DB2" may be more important than "Apache" and thus may be need to restarted first. In another example, a pattern-based scheme can involve certain known dependency patterns that can be detected, e.g., DB must be started before App Server, which must be started before Web server. In other embodiments, a service level agreement based or SLA-based scheme can involve a client designating the SLAs of virtual machines or VMs (e.g., Gold, Silver, Bronze) and this informs the importance assessment used in the sort ordering and eventual restart plan. In some embodiments, the Ontology can be expanded/overruled based on client preference, feedback, and rules. In some embodiments, the system can use explicit client feedback or alternatively use implicitly deduced information deduced from client-approved dependencies.

The heuristics, in accordance with various embodiments, can use operational data and/or discovery data. Operational data can be used from a product site to recommend resiliency configurations at the recovery site (e.g., high-availability or workload-balancing clusters) for components that have been observed to be unreliable and are thus paired into multiple instances that have tight dependencies upon each other. Such components would be configured into a cluster at the recovery site and started close together in time. Discovery data would involve the use of configuration metadata from a product site to detect that certain components comprise a cluster (either HA or workload balancing). This can be, for example, a variation of an ontologic method. Such components would be configured into a cluster at the recovery site and started close together in time.

A discussion of various example embodiments of the present disclosure will be provided below illustrating in more detail the several examples.

Referring to the flow diagram of FIG. 1 and according to one embodiment of the present disclosure, a method or system 10 for determining a suggested component restart order in a computer system includes performing one or more heuristic analyses (using a heuristic algorithm or processor 12) of a plurality of input data 11, performing one or more sort orders after one or more of each heuristic analysis and combining the one or more sort orders according to a weighting algorithm which can result in a restart/dependency plan 14. The method can further include generating a recovery dependency graph 16 between each of the components of the computer system and presenting the recovery dependency graph 16. In some embodiments, the one or more heuristic analysis can include one or more of calculating a popularity of one or more components of a computer system, determining component utilizations for one or more of the components, cross-correlating the component utilizations, or performing machine learning to discover additional relationships between components of the computer system. In some embodiments, the method includes sorting by correlation coefficients of the cross-correlation. In some embodiments, the method further includes processing importance ontology tags to identify components and dependencies of highest priority. In some embodiments the method further includes modifying the recovery dependency graph 16 based on client input 18, or providing an output or feeding a restart scheduler 19 for restarting the computer system based on the recovery dependency graph 16, and restarting the computer system based on the recovery dependency graph using a Recovery Planner and Execution Engine 19a. The Recovery Planner and Execution Engine 19a provides data recovery, virtual memory (VM) recovery, and application recovery to the Recovery Environment 19b in which restart is to be performed.

Figure 2:
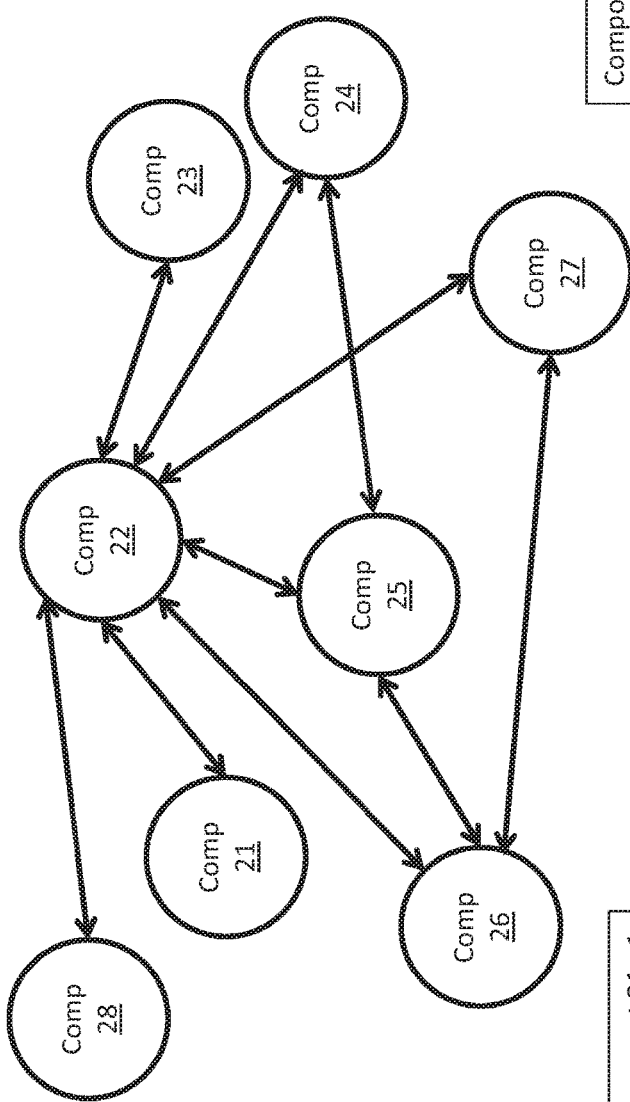
FIG. 2 is a representation of a user interface illustrating a recovery dependency graph that can be used with the system of FIG. 1.

The system of FIG. 1 can include a user interface 20 as shown in FIG. 2 that presents a sample recovery dependency graph 16 that presents a number of components 21, 22, 23, 24, 25, 26, 27, and 28. In one simplistic heuristic analysis, the method and system can determine how many times a given component is contacted by other components using a "popularity" metric. Such a metric can also include the frequency in which such components are contacted. Based on the popularity metric used, the method and system can perform a sort order and re-order the component listing to give greater priority to components that are more "popular". In this regard, since component 22 is contacted by 7 other components, component 22 would have the highest priority, followed by components 25 and 26, then components 24 and 27, and then components 23 and 28. If there are "ties" in priority, the heuristics can look at other factors such as utilization or importance ontology to provide an appropriate ordering.

In some embodiments, a system includes at least one memory and at least one processor of a computer system communicatively coupled to the at least one memory. The at least one processor can be configured to perform a method including determining a suggested component restart order in the computer system on a basis of one or more heuristic analyses of a plurality of input data, performing one or more sort orders after one or more of each heuristic analysis, and combining the one or more sort orders according to a weighting algorithm. The method can further include generating a recovery dependency graph between each of the components of the computer system and presenting the recovery dependency graph. In some embodiments, the system further includes a user interface for presenting the recovery dependency graph. In some embodiments, the system further includes a Recovery Planning and Execution component for actually invoking the recovery operations on the recovery environment.

According yet to another embodiment of the present disclosure, a computer readable storage medium comprises computer instructions which, responsive to being executed by one or more processors, cause the one or more processors to perform operations as described in the methods or systems above or elsewhere herein.

Figure 3:
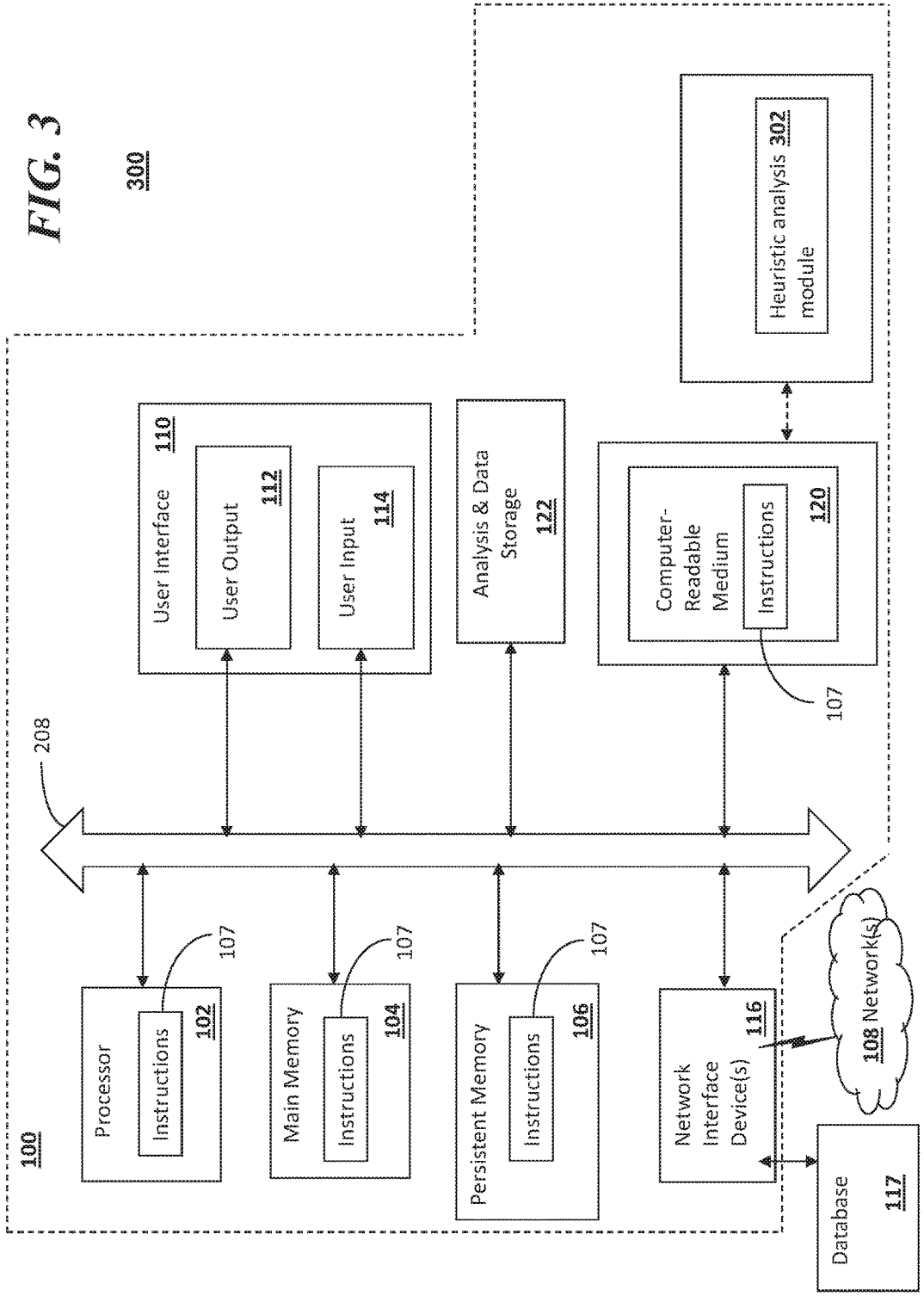
FIG. 3 is a block diagram of an information processing system according to various embodiments of the present disclosure.

As shown in FIG. 3, an information processing system 100 of a system 300 can be communicatively coupled with the heuristic analysis module 302 and a group of client or other devices as shown in FIG. 1 or 2, or coupled to a presentation device for display at any location at a terminal or server location. According to this example, at least one processor 102, responsive to executing instructions 107, performs operations to communicate with the heuristic analysis module 302 via a bus architecture 208, as shown. The at least one processor 102 is communicatively coupled with main memory 104, persistent memory 106, and a computer readable medium 120. The processor 102 is communicatively coupled with an Analysis & Data Storage 122 that, according to various implementations, can maintain stored information used by, for example, the heuristic analysis module 302 and more generally used by the information processing system 100. Optionally, for example, this stored information can include information received from the client or other devices. For example, this stored information can be received periodically from the client devices and updated or processed over time in the Analysis & Data Storage 122. Additionally, according to another example, a history log can be maintained or stored in the Analysis & Data Storage 122 of the information processed over time. The analysis module 302, and the information processing system 100, can use the information from the history log such as in the analysis process and in making decisions related to determining a sort order for use in a restart/dependency plan, or recovery dependency graph, or a restart scheduler.

The computer readable medium 120, according to the present example, can be communicatively coupled with a reader/writer device (not shown) that is communicatively coupled via the bus architecture 208 with the at least one processor 102. The instructions 107, which can include instructions, configuration parameters, and data, may be stored in the computer readable medium 120, the main memory 104, the persistent memory 106, and in the processor's internal memory such as cache memory and registers, as shown.

The information processing system 100 includes a user interface 110 that comprises a user output interface 112 and user input interface 114. Examples of elements of the user output interface 112 can include a display, a speaker, one or more indicator lights, one or more transducers that generate audible indicators, and a haptic signal generator. Examples of elements of the user input interface 114 can include a keyboard, a keypad, a mouse, a track pad, a touch pad, a microphone that receives audio signals, a camera, a video camera, or a scanner that scans images. The received audio signals or scanned images, for example, can be converted to electronic digital representation and stored in memory, and optionally can be used with corresponding voice or image recognition software executed by the processor 102 to receive user input data and commands, or to receive test data for example.

A network interface device 116 is communicatively coupled with the at least one processor 102 and provides a communication interface for the information processing system 100 to communicate via one or more networks 108. The networks 108 can include wired and wireless networks, and can be any of local area networks, wide area networks, or a combination of such networks. For example, wide area networks including the Internet and the web can intercommunicate the information processing system 100 with other one or more information processing systems that may be locally, or remotely, located relative to the information processing system 100. It should be noted that mobile communications devices, such as mobile phones, Smart phones, tablet computers, lap top computers, and the like, which are capable of at least one of wired and/or wireless communication, are also examples of information processing systems within the scope of the present disclosure. The network interface device 116 can provide a communication interface for the information processing system 100 to access the at least one database 117 according to various embodiments of the disclosure.

The instructions 107, according to the present example, can include instructions for monitoring, instructions for analyzing, instructions for retrieving and sending information and related configuration parameters and data. It should be noted that any portion of the instructions 107 can be stored in a centralized information processing system or can be stored in a distributed information processing system, i.e., with portions of the system distributed and communicatively coupled together over one or more communication links or networks.

FIG. 4 illustrates an example of a method, according to various embodiments of the present disclosure, which can operate in conjunction with the information processing system of FIG. 3. Specifically, according to the example shown in FIG. 4, a method 400 for determining a suggested component restart order in a computer system. The system can include the step 402 of receiving input data from a plurality of components. The method further includes determining at 404 the component restart order based on one or more heuristic analyses of a plurality of input data, and performing one or more sort orders at 406 after one or more of each heuristic analysis. At decision block 407, if more heuristic analysis and sort orders are awaiting, then the method returns to step 404. If no further heuristic analysis is left to be performed, then the method 400 combines the one or more sort orders at step 408 according to a weighting algorithm. The method 400 can further include generating at 410 a recovery dependency graph between each of the components of the computer system and presenting at 411 the recovery dependency graph. In some embodiments, the one or more heuristic analysis (404) can include one or more of calculating a popularity of one or more components of a computer system, determining component utilizations for one or more of the components, cross-correlating the component utilizations, or performing machine learning to discover additional relationships between components of the computer system. In some embodiments, the method includes sorting by correlation coefficients of the cross-correlation. In some embodiments, the method further includes processing importance ontology tags to identify components and dependencies of highest priority. In some embodiments the method further includes modifying the recovery dependency graph based on client input (see block 18 of FIG. 1), restarting the computer system based on the recovery dependency graph, or feeding a restart scheduler (see block 19 of FIG. 1) for restarting the computer system based on the recovery dependency graph.

Non-Limiting Examples

The present invention may be a system, a method, and/or a computer program product. The computer program product may include a computer readable storage medium (or media) having computer readable program instructions thereon for causing a processor to carry out aspects of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer readable program instructions described herein can be downloaded to respective computing/processing devices from a computer readable storage medium or to an external computer or external storage device via a network or networks, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flow diagram illustrations and/or block diagrams of methods, apparatus (systems), and computer program products according to embodiments of the invention. It will be understood that each block of the flow diagram illustrations and/or block functional diagrams, and combinations of blocks in the flow diagram illustrations and/or block functional diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagrams and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow diagram and/or functional block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow diagram and/or block diagram block or blocks.

The flow diagram and block diagrams in the Figures illustrate the architecture, functionality, and operation of possible implementations of systems, methods, and computer program products according to various embodiments of the present invention. In this regard, each block in a flow diagram or block diagram may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or acts or carry out combinations of special purpose hardware and computer instructions.

While the computer readable storage medium is shown in an example embodiment to be a single medium, the term "computer readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methods of the subject disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a computer-readable storage medium, as listed herein and including art-recognized equivalents and successor media, in which the software implementations herein are stored.

Although the present specification may describe components and functions implemented in the embodiments with reference to particular standards and protocols, the disclosure is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor is illustrated for an information processing system, information processing systems with multiple CPUs or processors can be used equally effectively. Various embodiments of the present disclosure can further incorporate interfaces that each includes separate, fully programmed microprocessors that are used to off-load processing from the processor. An operating system (not shown) included in main memory for the information processing system may be a suitable multitasking and/or multiprocessing operating system, such as, but not limited to, any of the Linux, UNIX, Windows, and Windows Server based operating systems. Various embodiments of the present disclosure are able to use any other suitable operating system. Various embodiments of the present disclosure utilize architectures, such as an object oriented framework mechanism, that allows instructions of the components of operating system (not shown) to be executed on any processor located within the information processing system. Various embodiments of the present disclosure are able to be adapted to work with any data communications connections including present day analog and/or digital techniques or via a future networking mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop personal computer (laptop PC), a tablet computer, a smart phone, a mobile phone, a wireless communication device, a personal digital assistant, a workstation, and the like. A processing system may include one or more processing systems or processors. A processing system can be realized in a centralized fashion in one processing system or in a distributed fashion where different elements are spread across several interconnected processing systems.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

What is claimed is:

1. A computer-implemented method for restarting a computer system comprising a plurality of components that have start-order interdependencies to ensure that workload components are started correctly, the method comprising:
receiving input data from multiple sources of information, the input data at least indicating:
logical dependencies and physical layout between more than 1000 components in a plurality of components of a computer system implemented in a cloud computing environment;
which components in the plurality of components communicate with each other;
a utilization metric for each component in the plurality of components, the utilization metric including one or more of: CPU usage, memory usage, storage usage, storage bandwidth, or network bandwidth; and
a recovery time objective (RTO) defining a maximum time period as an RTO time constraint within which to restart the plurality of components in the computer system;
determining, by at least one processor of at least one computing device, a suggested component restart order indicating a restart priority for each of the components in the plurality of components relative to other components in the plurality of components on a basis of a plurality of heuristic analyses of the input data, the plurality of heuristic analyses including a first heuristic analysis of the input data and a second heuristic analysis of the input data, the second heuristic analysis being different from, and lower priority to, the first heuristic analysis;
performing, by the at least one processor, a first sort of an initial order for the plurality of components to provide a first sorted restart order for the plurality of components based on the first heuristic analysis of the input data;
performing, by the at least one processor, a second sort of the initial order for the plurality of components to provide a second sorted restart order based on the second heuristic analysis of the input data;
combining, by the at least one processor, the first sorted restart order and the second sorted restart order for the plurality of components to provide the suggested component restart order, the combination of the first sorted restart order and the second sorted restart order performed by prioritizing relative to each other an order of equal priority components in the first sorted restart order based on the second sorted restart order of the equal priority components;
generating a recovery dependency graph between each of the components in the plurality of components of the computer system, based on the combined first sorted restart order and second sorted restart order for the plurality of components and based on the RTO time constraint, and generating a recovery plan specifying a recovery order for the plurality of components with maximum parallelism for restarting the plurality of components within the defined RTO time constraint;
presenting, at a user interface, the recovery dependency graph and the recovery plan;
analyzing the recovery dependency graph and the recovery plan and determining that a restart of the plurality of the components according to the recovery plan will meet the defined RTO time constraint; and
feeding a restart scheduler, implemented with software, with data corresponding to the recovery dependency graph and the recovery plan for the restart scheduler causing restart of the plurality of components of the computer system within the defined RTO time constraint and based on the recovery dependency graph and the recovery plan; and
restarting, with the restart scheduler, the plurality of components of the computer system based on the recovery dependency graph and the recovery plan.

2. The method of claim 1, wherein one of the first and second heuristic analysis comprises calculating a popularity of each component of the computer system.

3. The method of claim 1, wherein one of the first and second heuristic analysis comprises determining component utilizations for each of the components of the computer system.

4. The method of claim 1, wherein one of the first and second heuristic analysis comprises determining component utilizations for each of the components of the computer system and cross-correlating the component utilizations.

5. The method of claim 1, wherein one of the first and second heuristic analysis comprises at least one of calculating a popularity of each component of a computer system, determining component utilizations for each of the components, or cross-correlating the component utilizations.

6. The method of claim 1, wherein one of the first and second heuristic analysis comprises performing machine learning to discover additional relationships between components of the computer system.

7. The method of claim 1, wherein one of the first and second heuristic analysis comprises at least one of calculating a popularity of one or more components of a computer system, determining component utilizations for one or more of each of the components, or cross-correlating the component utilizations.

8. The method of claim 1, wherein one of the first sort and the second sort comprises one or more of sorting each of the components by a popularity of each component of a computer system, sorting by component utilizations, sorting by the cross-correlation of the component utilization, or sorting by correlation coefficients of the cross-correlation.

9. The method of claim 1, further comprising processing importance ontology tags associated with components in the plurality of components to identify components and dependencies of highest priority.

10. The method of claim 1, further modifying the recovery dependency graph based on client input.

11. The method of claim 1, further comprising the restart scheduler restarting the computer system based on the recovery dependency graph.

12. A system comprising:
a user interface;
at least one memory; and
at least one processor of a computer system communicatively coupled to the at least one memory and to the user interface, the at least one processor, responsive to instructions stored in memory, being configured to perform a method comprising:
receiving input data from multiple sources of information, the input data at least indicating:
logical dependencies and physical layout between more than 1000 components in a plurality of components of a computer system implemented in a cloud computing environment;
which components in the plurality of components communicate with each other;
a utilization metric for each component in the plurality of components, the utilization metric including one or more of: CPU usage, memory usage, storage usage, storage bandwidth, or network bandwidth; and
a recovery time objective (RTO) defining a maximum time period as an RTO time constraint within which to restart the plurality of components in the computer system;
determining a suggested component restart order indicating a restart priority for each of the components in the plurality of components relative to other components in the plurality of components on a basis of a plurality of heuristic analyses of the input data, the plurality of heuristic analyses including a first heuristic analysis of the input data and a second heuristic analysis of the input data, the second heuristic analysis being different from, and lower priority to, the first heuristic analysis;
performing a first sort of an initial order for the plurality of components to provide a first sorted restart order for the plurality of components based on the first heuristic analysis of the input data;
performing a second sort of the initial order for the plurality of components to provide a second sorted restart order based on the second heuristic analysis of the input data;
combining the first sorted restart order and the second sorted restart order for the plurality of components to provide the suggested component restart order, the combination of the first sorted restart order and the second sorted restart order performed by prioritizing relative to each other component an order of equal priority components in the first sorted restart order based on the second sorted restart order of the equal priority components;
generating a recovery dependency graph between each of the components in the plurality of components of the computer system, based on the combined first sorted restart order and second sorted restart order for the plurality of components and based on the RTO time constraint, and generating a recovery plan specifying a recovery order for the plurality of components with maximum parallelism for restarting the plurality of components within the defined RTO time constraint;
presenting, at the user interface, the recovery dependency graph and the recovery plan;
analyzing the recovery dependency graph and the recovery plan and determining that a restart of the plurality of the components according to the recovery plan will meet the defined RTO time constraint;
feeding a restart scheduler, implemented with software, with data corresponding to the recovery dependency graph and the recovery plan for the restart scheduler causing restart of the plurality of components of the computer system within the defined RTO time constraint and based on the recovery dependency graph and the recovery plan; and
restarting, with the restart scheduler, the plurality of components of the computer system based on the recovery dependency graph and the recovery plan.

13. The system of claim 12, further comprising a display in the user interface, and wherein the presenting comprises displaying the recovery dependency graph and the recovery plan.

14. A non-transitory computer-readable medium having stored therein instructions which, when executed by at least one processor, cause a computer system to perform a method comprising:
receiving input data from multiple sources of information, the input data at least indicating:
logical dependencies and physical layout between more than 1000 components in a plurality of components of a computer system implemented in a cloud computing environment;

which components in the plurality of components communicate with each other; and a utilization metric for each component in the plurality of components, the utilization metric including one or more of: CPU usage, memory usage, storage usage, storage bandwidth, or network bandwidth; and a recovery time objective (RTO) defining a maximum time period as an RTO time constraint within which to restart the plurality of components in the computer system;

determining, by at least one processor of at least one computing device, a suggested component restart order indicating a restart priority for each of the components in the plurality of components relative to other components in the plurality of components on a basis of a plurality of heuristic analyses of the input data, the plurality of heuristic analyses including a first heuristic analysis of the input data and a second heuristic analysis of the input data, the second heuristic analysis being different from, and lower priority to, the first heuristic analysis;

performing, by the at least one processor, a first sort of an initial order for the plurality of components to provide a first sorted restart order for the plurality of components based on the first heuristic analysis of the input data;

performing, by the at least one processor, a second sort of the initial order for the plurality of components to provide a second sorted restart order based on the second heuristic analysis of the input data;

combining, by the at least one processor, the first sorted restart order and the second sorted restart order for the plurality of components to provide the suggested component restart order, the combination of the first sorted restart order and the second sorted restart order performed by prioritizing relative to each other an order of equal priority components in the first sorted restart order based on the second sorted restart order of the equal priority components;

generating a recovery dependency graph between each of the components in the plurality of components of the computer system, based on the combined first sorted restart order and second sorted restart order for the plurality of components and based on the RTO time constraint, and generating a recovery plan specifying a recovery order for the plurality of components with maximum parallelism for restarting the plurality of components within the defined RTO time constraint;

presenting, at a user interface, the recovery dependency graph and the recovery plan;

analyzing the recovery dependency graph and the recovery plan and determining that a restart of the plurality of the components according to the recovery plan will meet the defined RTO time constraint;

feeding a restart scheduler, implemented with software, with data corresponding to the recovery dependency graph and the recovery plan for the restart scheduler causing restart of the plurality of components of the computer system within the defined RTO time constraint and based on the recovery dependency graph and the recovery plan; and restarting, with the restart scheduler, the plurality of components of the computer system based on the recovery dependency graph and the recovery plan.

15. The non-transitory computer-readable medium of claim 14, the method further comprising performing machine learning to discover additional relationship between components of the computer system.

16. The non-transitory computer-readable medium of claim 14, the method further comprising processing importance ontology tags to identify components and dependencies of highest priority.

17. The non-transitory computer-readable medium of claim 14, the method further comprising modifying the recovery dependency graph based on client input.

* * * * *